United States Patent Office 3,175,296
Patented Mar. 30, 1965

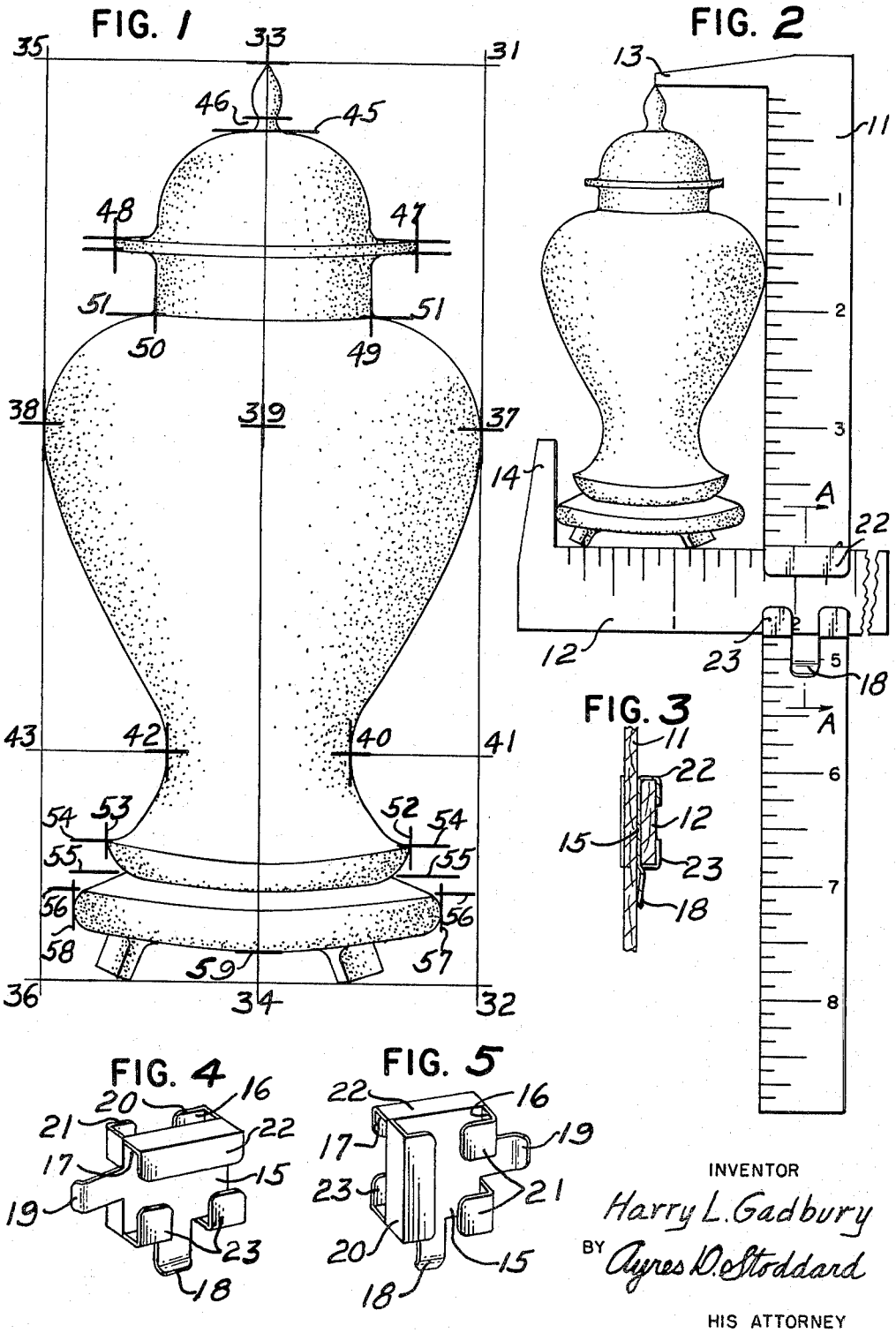

3,175,296
DRAWING AIDS
Harry L. Gadbury, 1245 Wabash Ave., Dayton, Ohio
Filed July 6, 1962, Ser. No. 207,879
1 Claim. (Cl. 33—64)

My invention relates to improvements in drawing aids to enable the user to easily and accurately compose any picture which he wishes to draw, as he views it through a pre-set or predetermined designated area of the drawing aid.

Thus my invention provides a comparatively simple, but highly efficient and accurate means or apparatus for facilitating the reproduction upon a sheet of drawing paper or canvas, of a scene, or portrait, or for facilitating the transferring or copying of a portrait or still life, whether it be a single object or a group of objects.

I prefer to call my invention an iconometer which means image meter, and this is therefore a device for measuring objects at a distance from the eye for the express purpose of reproduction, as a drawing.

The use of my iconometer makes obsolete and therefore eliminates the old and inaccurate method of measuring where that artist sights along a pencil or stick using the tip of the thumb to slide up and down on the pencil to indicate the relative sizes of the different parts of the object to be drawn. As above stated this thumb and pencil method is very inaccurate and therefore entirely unsatisfactory.

However my iconometer provides for the student or artist an easy way to see measurements which can be easily transferred to the drawing paper or canvas, whichever is being used as the medium on which the picture is to be drawn or painted.

My invention particularly is adapted to facilitate measuring an object, scene or portrait at a distance for accurate reproduction.

My device is particularly adapted to permit the user to establish proportions of an object to be drawn such as 1 to 2 or 1 to 4 etc. depending upon the size chosen by the user, by simply changing the distance from the iconometer to the object to be drawn.

It is therefore an object of my invention to provide a drawing aid or apparatus of the class above mentioned, comprising two graduated members held at right angles to each other and arranged to slide relatively to each other, vertically and horizontally to produce different measurements, said graduated members being slidably mounted in a bracket having a vertical trough or channel and a horizontal trough or channel.

Another object of my invention is to mount said members so that they are frictionally held in any position into which they may be adjusted.

A further object is to provide said bracket with fingers to contact the surfaces of the graduated members to retain said members in any of the positions into which they have been adjusted for measuring purposes.

Another object of my invention is to provide measuring graduations on both sides of said members to facilitate the measuring of objects to be drawn or painted.

With these and other incidental objects in view, my invention consists of certain novel features of construction and combinations of parts, the essential elements of which are set forth in appended claim, and a preferred form or embodiment of which is hereinafter described with reference to the drawings which accompany and form part of this application.

Of said drawings:

FIG. 1 is a view, in enlarged scale, showing a vase drawn with the aid of the iconometer shown in FIG. 2.

FIG. 2 illustrates the iconometer and a vase framed thereby by means of which the vase picture shown in FIG. 2 was produced.

FIG. 3 is a section on line A—A of FIG. 2, and shows a section of the bracket which provides the holding means for the graduated members and also provides the means by which the graduated members may be adjusted relatively to each other to measure the object being drawn, in this case, the vase.

FIG. 4 is a perspective view of the bracket, showing the front, left side and top.

FIG. 5 is a perspective view of the bracket, showing the back, right side and top.

*General description*

Described in general terms my novel drawing aid or iconometer includes a device for measuring objects at a distance from the eye for the purpose of reproduction, such as a drawing or a painting.

My iconometer is composed of three units, as follows; a graduated rule with a finger at the top forming a right angle, the graduations and numbers on this rule are arranged for vertical reading. The second unit is a similar graduated rule with a finger projecting upward and forming a right angle, the graduations and numbers on this rule are arranged for horizontal reading. The rules are both graduated on both sides thereof. The third unit comprises the bracket having two troughs or channels so devised that when the two rules are inserted they form a right angle, thus the rules can be adjusted relatively to each other within the limits of their length.

*Detailed description*

My iconometer is shown in FIG. 2 and is comprised of a vertical rule 11 and a horizontal rule 12. The rule 11 is graduated in inches, each one inch section being subdivided into 8 parts. At the top rule 11 has a finger 13 projecting at right angles thereto. At the left end the rule 12 has a finger 14 projecting at right angles thereto. This rule 12 also is graduated in inches with 8 subdivisions to the inch and these graduations are numbered for horizontal reading.

These two rules 11 and 12 are slidably mounted in a bracket 15, FIGS. 2 to 5. The vertical rule 11 slides in a trough or channel 16 of the bracket 15, and the rule 12 slides in a trough or channel 17 of the bracket 15. A finger 18 projects downwardly from the bracket 15 and frictionally engages the face of the rule 11. A finger 19 projects laterally from the bracket 15 and frictionally engages the face of the rule 12.

The vertical channel 16 is formed by angled flanges 20 and 21 (FIG. 5) projecting from the bracket 15. The horizontal channel 17 is formed by angled flanges 22 and 23 (FIGS. 3 and 4) projecting from the bracket 15.

By moving the horizontal rule 12 from side to side in the channel 17 different horizontal measurements may be obtained. By moving the vertical rule 11 up and down in the channel 16 different vertical measurements may be obtained.

After determining, for example, the object to be drawn the size thereof may be determined by framing the object between the top edge of the rule 12 and left side of the rule 11 using the fingers 13 and 14 for the top and left sides respectively.

After deciding upon the size wanted then from this point the user of the iconometer must always sit or stand in the same position. All sighting must be done by holding the inconometer at arm's length and sight with one eye, always holding the iconometer so that the vertical rule 11 is plumb or truly vertical.

Let us now assume that the height of the drawing is to be eight inches and for illustrative purposes a vase will be the object to be drawn eight inches high. This vase shown in FIG. 1 is approximately eight inches high. FIG. 2 shows the vase being sighted by the inconometer as four inches high or one half the size of FIG. 1.

Since it has been determined to make the vase eight inches high, draw a horizontal line 31–35 across the top and eight inches below the line 31–35 draw the bottom line 32–36. Next draw a vertical line 33–34 in the center of the drawing surface. We now have lines 31–35 and 32–36 indicating the top and bottom of the vase being drawn. Line 33–34 is the center line or middle of the vase.

Next take a sight reading to get the overall height of the vase on the iconometer. To do this hold the iconometer at arm's length then close one eye and sight at the vase. Adjust the horizontal rule 12 up or down until the vase fits between the finger 13 on top of the rule 11 and the main body, or top edge of the horizontal rule 12. Now read the height which shows 4 inches. Since the height of the drawing is 8 inches the proportion will be 1 to 2. Now each reading on the iconometer must be multiplied by two and this dimension transferred to the drawing.

Next measure the widest part of the vase. The widest part of the vase should just touch the left edge of the vertical rule 11. Now move the horizontal rule 12 up to the wide section of the vase and out until the finger 14 is in line with the outer edge of the vase. Keep the finger 13 on top in line with the top point and the top edge of the horizontal rule 12 at the widest part of the vase. The rules 11 and 12 now show that the widest part of the vase is $1^{15}/_{16}$ inches and it is $1^{5}/_{8}$ inches down from the top. This wide part of the vase is marked 37 to 38.

Since the proportion is 1 to 2 the widest part of the vase will be 3¾ inches down from the top and the width will be 3⅞ inches, or $1^{15}/_{16}$ inches on each side of the centerline 33–34. Indicate a point 39 on the center line 33–34, 3¼ inches down from the top, draw a horizontal line through 39 and measure $1^{15}/_{16}$ inches on this line on each side of the point 39. This is the extreme width and it is indicated by 37–38. Now draw a line from 35 to 36 through 38 and a line from 31 to 32 through 37. This gives up a rectangle which encloses the vase. Since the vase is symmetrical in design, we need only to measure one side and apply these measurements to the opposite side or opposite half of the figure.

By holding the iconometer in a position as shown in the illustration with the vertical rule 11 just touching the side of the vase at its widest dimension and the finger 13 held at the top of the lid, the horizontal rule 12 can be adjusted up and down, back and forth, in order to get the correct measurement of any point on the vase. For example, adjust the horizontal rule 12 at the narrowest part of the vase the finger 14 being located at 40 and the vertical rule 11 along the line 31–32 and the finger 13 at 33. This shows that the distance 40–41 is 1⅛ inches. Therefore the distance 42–43 is 1⅛ inches.

The vertical distance is measured at 40 and 42. All other points are located by the same method of measurement.

The other salient parts for measurement are as follows; and measurement by the iconometer shows the top of the vase dome 45 to be ⅝ inch from the top line 31–35, and the neck 46 to be ⅛ of an inch above the top of the dome at the line 45.

The flange 47 is ⅛ inch thick and from 47 to 48 it is 2⅝ inches. The neck 49–50 is $1^{15}/_{16}$ inches and the bottom of the neck 51—51 is 2¼ inches from the top line 31–35.

The flare above the base is $9/_{16}$ inch from the line 31–32 at point 52, thus the point 53 is $9/_{16}$ from the line 35–36. Line 54—54 shows the height of the flare as 1 and $3/_{16}$ inches from the base line 32–36. The neck 55—55 of the flare is $15/_{16}$ inch from the base line 32–36.

The base at line 56—56 is ¾ inch from the base line 32–36, and the edge 57 of the base is ¼ inch from the vertical line 31–32. The bottom of the base at 59 is $3/_{16}$ inch from the base line 32–36.

While the form of apparatus shown and described is admirably adapted to fulfill the objects primarily stated, it is to be understood that I do not wish to limit my invention to the one specific form herein shown and described, for it is susceptible of other embodiments, all coming within the scope of the claim which follows.

What I claim as new is:

In an apparatus of the class described, the combination of a plurality of graduated members arranged at right angles to each other, one vertical and another horizontal; a projection at one extremity of each of said members and extending at right angles thereto and at right angles to each other; a bracket common to all members said bracket having horizontal flanges formed on the horizontal top and bottom edges of said bracket to produce a support channel for the horizontal member, said bracket also having vertical flanges formed on the vertical side edges of said bracket to produce a support channel for the vertical member; a finger on said bracket formed from one of said horizontal flanges and extending vertically below said horizontal flanges to contact the vertical member; and a second finger on said bracket formed from one of said vertical flanges and extending horizontally off side and beyond said vertical flanges to contact said horizontal member.

References Cited by the Examiner

UNITED STATES PATENTS

| 696,687 | 4/02 | Meyer | 33—106 |
| 827,239 | 7/06 | Hoy | 33—106 |
| 2,373,338 | 4/45 | Rakauskas | 33—173 |

FOREIGN PATENTS

| 1,112,690 | 11/55 | France. |
| 83,648 | 10/95 | Germany. |

ISAAC LISANN, *Primary Examiner.*